(12) United States Patent
Nagayama (10) Patent No.: US 12,480,282 B2
(45) Date of Patent: Nov. 25, 2025

(54) METHOD OF CONTROLLING HYDRAULIC DEVICE

(71) Applicant: Nabtesco Corporation, Tokyo (JP)

(72) Inventor: Hiromi Nagayama, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 18/508,360

(22) Filed: Nov. 14, 2023

(65) Prior Publication Data

US 2024/0200306 A1 Jun. 20, 2024

(30) Foreign Application Priority Data

Dec. 20, 2022 (JP) ................. 2022-203088

(51) Int. Cl.
| | |
|---|---|
| E02F 9/22 | (2006.01) |
| F16H 61/4008 | (2010.01) |
| F16H 61/4035 | (2010.01) |
| F16H 61/431 | (2010.01) |
| F16H 61/472 | (2010.01) |
| F16H 59/14 | (2006.01) |
| F16H 59/36 | (2006.01) |
| F16H 59/68 | (2006.01) |

(52) U.S. Cl.
CPC .......... *E02F 9/2235* (2013.01); *E02F 9/2289* (2013.01); *E02F 9/2296* (2013.01); *F16H 61/4008* (2013.01); *F16H 61/4035* (2013.01); *F16H 61/431* (2013.01); *F16H 61/472* (2013.01); *F16H 2059/147* (2013.01); *F16H 2059/148* (2013.01); *F16H 2059/366* (2013.01); *F16H 2059/6846* (2013.01); *F16H 2059/6861* (2013.01); *F16H 2059/6876* (2013.01); *F16H 2059/6892* (2013.01)

(58) Field of Classification Search
CPC ..... E02F 9/2235; E02F 9/2289; E02F 9/2296; F16H 61/4008; F16H 61/4035; F16H 61/431; F16H 61/472; F16H 2059/147; F16H 2059/148; F16H 2059/366; F16H 2059/6846; F16H 2059/6861; F16H 2059/6876; F16H 2059/6892
See application file for complete search history.

(56) References Cited

U.S. PATENT DOCUMENTS

| | | | | |
|---|---|---|---|---|
| 8,196,400 B2* | 6/2012 | Palo | ...................... | E02F 9/2232 60/449 |
| 8,540,048 B2* | 9/2013 | Will | ...................... | F16H 61/421 180/338 |

(Continued)

FOREIGN PATENT DOCUMENTS

JP 2010-133469 A 6/2010

*Primary Examiner* — Dustin T Nguyen
(74) *Attorney, Agent, or Firm* — Pillsbury Winthrop Shaw Pittman, LLP (57) ABSTRACT

A method of controlling an oil pressure system according to an aspect of the disclosure includes: a comparison step of comparing a measured load (engine torque calculation value) of an oil pressure system driven by an oil pressure pump with an allowable load of the oil pressure system (allowable engine torque value); and a control step of controlling a flow rate of the oil pressure pump based on a result of comparison between the measured load and the allowable load.

9 Claims, 3 Drawing Sheets

(56) References Cited

U.S. PATENT DOCUMENTS

| | | | |
|---|---|---|---|
| 8,701,818 B2 * | 4/2014 | Shirao | E02F 9/2253 |
| | | | 180/305 |
| 10,947,701 B2 * | 3/2021 | Hyodo | F02D 29/04 |
| 11,286,646 B2 * | 3/2022 | Hyodo | E02F 9/2296 |

* cited by examiner

METHOD OF CONTROLLING HYDRAULIC DEVICE

CROSS-REFERENCE TO RELATED APPLICATIONS

This application is based on and claims the benefit of priority from Japanese Patent Application Serial No. 2022-203088 (filed on Dec. 20, 2022), the contents of which are hereby incorporated by reference in their entirety.

TECHNICAL FIELD

The present disclosure relates to a method of controlling a hydraulic device.

BACKGROUND

Some mechanical vehicles, such as for example hydraulic excavators, use an engine to drive an oil pressure pump, and the oil pressure pump pressurizes hydraulic oil to drive a hydraulic motor, which in turn drives the crawler or the like of the vehicle for traveling. When an excessive load acts on this mechanical vehicle during, for example, traveling or earth removal operation, it may result in excessive torque being applied to the engine, causing the engine to stall or the rotation speed of the engine to drop. As a countermeasure, a method is disclosed to reduce the displacement of the oil pressure pump by controlling the displacement control device according to a threshold value set based on the calculated deviation between the rotation speed of the engine and the amount of operation of the operating pedal, the deviation being calculated with a controller (e.g., Japanese Patent Application Publication No. 2010-133469).

However, this method cannot detect the deviation between the amount of operation of the operating pedal and the rotation speed of the engine until occurrence of the difference between the amount of operation of the operating pedal and the rotation speed of the engine. As a result, the response in control of the displacement control device for the oil pressure pump is delayed relative to the load acting on the mechanical vehicle. Specifically, the engine may be overloaded when the rotation speed of the engine starts to drop, and the engine may have already exceeded the recommended service conditions in the specifications.

SUMMARY

The present disclosure provides a method of controlling a hydraulic device capable of responsively reducing the engine torque consumed by the load of the hydraulic device.

To overcome the above problem, aspects of the present disclosure include the following methods. A method of controlling a hydraulic device according to an aspect of the disclosure comprises: a comparison step of comparing a measured load of a hydraulic device driven by a hydraulic pump with an allowable load of the hydraulic device; and a control step of controlling a flow rate of the hydraulic pump based on a result of comparison between the measured load and the allowable load.

Thus, by controlling the flow rate (discharge flow rate, displacement) of the hydraulic pump, the flow rate of the hydraulic pump can be reduced such that, for example, the allowable load of the hydraulic device is not exceeded. The hydraulic pump is driven by a power source (an engine). Therefore, by reducing the flow rate of the hydraulic pump such that the allowable load of the hydraulic device is not exceeded, it is possible to responsively reduce the engine torque consumed by the load of the hydraulic device. This suitably inhibits the engine stall or dropping of the engine rotation speed when the engine is overloaded during, for example, traveling or earth removal operation of the machine vehicle including the hydraulic device.

In the method described above, it is also possible that an engine drives the hydraulic pump, and the hydraulic pump drives a hydraulic motor, and the measured load of the hydraulic device includes an engine torque calculation value calculated based on a discharge pressure of the hydraulic pump, a suction pressure of the hydraulic pump, and a rotation speed of the hydraulic motor or a flow rate of the hydraulic motor.

In the method described above, it is also possible that the allowable load of the hydraulic device includes an allowable engine torque value predetermined based on a rotation speed of the engine or an amount of operation of an operation unit for operating the engine.

In the method described above, it is also possible that in the control step, the flow rate of the hydraulic pump is controlled by a control valve, In the method described above, it is also possible that in the comparison step, comparison is performed between the engine torque calculation value as the measured load and the allowable engine torque value as the allowable load, and in the control step, when the engine torque calculation value is expected to exceed the allowable engine torque value, the flow rate of the hydraulic pump is reduced by adjusting the control valve.

In the method described above, it is also possible that the hydraulic pump includes a variable displacement hydraulic pump of which a flow rate is varied by adjusting a tilt angle of a swash plate, and in the control step, the flow rate of the hydraulic pump is controlled by adjusting the tilt angle of the swash plate.

In the method described above, it is also possible that in the comparison step, comparison is performed between the engine torque calculation value as the measured load and the allowable engine torque value as the allowable load, and in the control step, when the engine torque calculation value is expected to exceed the allowable engine torque value, the flow rate of the hydraulic pump is reduced by adjusting the tilt angle of the swash plate.

In the method described above, it is also possible that the engine torque calculation value is calculated further taking into account a liquid temperature measured upstream of the control valve.

The method described above may further comprise a drain step of draining a hydraulic fluid by a flushing valve from a channel connected to the hydraulic motor.

With this configuration, the heat of the hydraulic fluid in the channel connected to the hydraulic motor can be released to the outside. This allows the temperature of the hydraulic fluid to be maintained suitably, thereby enhancing the cooling effect of the hydraulic fluid.

A method of controlling a hydraulic device according to another aspect of the disclosure comprises: a comparison step of comparing a measured load of a hydraulic device driven by a hydraulic pump with an allowable load of the hydraulic device; and a control step of controlling a flow rate of the hydraulic pump based on a result of comparison between the measured load and the allowable load, wherein an engine drives the hydraulic pump, and the hydraulic pump drives a hydraulic motor, wherein an engine torque calculation value is calculated based on a discharge pressure of the hydraulic pump, a suction pressure of the hydraulic pump, and a rotation speed of the hydraulic motor or a flow rate of the hydraulic motor, wherein an allowable engine torque value is predetermined based on a rotation speed of the engine or an amount of operation of an operation unit for operating the engine, wherein in the comparison step, comparison is performed between the engine torque calculation value as the measured load and the allowable engine torque value as the allowable load, and wherein in the control step, when the engine torque calculation value is expected to exceed or the allowable engine torque value, the flow rate of the hydraulic pump is reduced by adjusting a control valve.

When the engine torque calculation value is expected to exceed the allowable engine torque value, the flow rate of the hydraulic pump can be reduced by adjusting the control valve. The hydraulic pump is driven by an engine. Therefore, by reducing the flow rate of the hydraulic pump such that the allowable engine torque value is not exceeded, it is possible to responsively reduce the engine torque consumed by the load of the hydraulic device. This suitably inhibits the engine stall or dropping of the engine rotation speed when the engine is overloaded during, for example, traveling or earth removal operation of the machine vehicle including the hydraulic device.

A pressure sensor for measuring the discharge pressure of the hydraulic pump, a pressure sensor for measuring the suction pressure of the hydraulic pump, and a motor tachometer for measuring the rotation speed of the hydraulic motor can be integrated together with the hydraulic motor as a hydraulic motor unit. This makes it possible to apply the hydraulic motor unit to other hydraulic pumps, thereby expanding the applications of the hydraulic motor unit.

The allowable load of the hydraulic device is an allowable engine torque value corresponding to a rotation speed of the engine or an amount of operation of an operation unit for operating the engine. Therefore, the accuracy of the allowable engine torque value can be increased compared to, for example, the case where the allowable engine torque value is set to a constant value based on the specifications of the engine. This suitably inhibits the engine stall or dropping of the engine rotation speed when the engine is overloaded during, for example, traveling or earth removal operation of the machine vehicle including the hydraulic device.

The control valve can be integrated together with the hydraulic motor as the hydraulic motor unit. It can thus be ensured that the hydraulic motor unit reduces the flow rate of the hydraulic pump. This makes it possible to apply the hydraulic motor unit integrated as a unit to other hydraulic pumps, thereby expanding the applications of the hydraulic motor unit.

The flow rate of the hydraulic pump is reduced by adjusting the control valve. Therefore, the flow rate (discharge flow rate) of the hydraulic pump can be reduced by adjusting the flow rate of the liquid with the control valve. Thus, the flow rate of the hydraulic pump can be reduced responsively. It can be avoided that the control of reducing the flow rate of the hydraulic pump overlaps or interferes with, for example, the control of the hydraulic pump during normal traveling of the machine vehicle. The control in the hydraulic device can be simplified.

According to the present disclosure, it is possible to responsively reduce the engine torque consumed by the load of the hydraulic device.

DESCRIPTION OF THE EMBODIMENTS

A method of controlling a hydraulic device relating to an embodiment of the present disclosure will be hereinafter described with reference to the drawings. The following description relates to an oil pressure system 1 as an example of the hydraulic device recited in the claims.

<Oil Pressure System>

Figure 1:
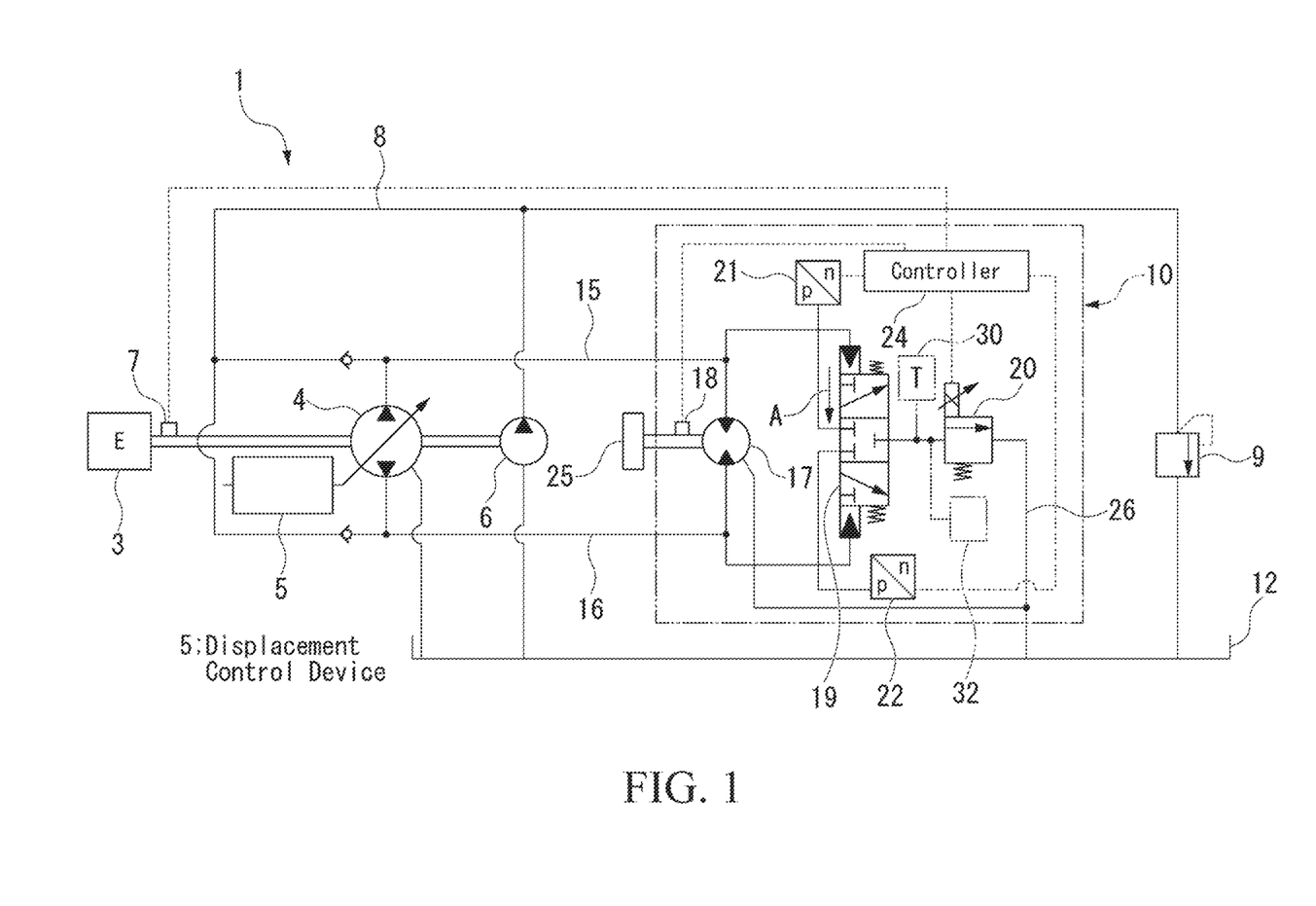
FIG. 1 schematically illustrates an oil pressure system relating to an embodiment of the present disclosure.

FIG. 1 schematically shows an oil pressure system 1. The two solenoid proportional valves 20 shown by the imaginary lines in FIG. 1 will be described for the examples of variation of the embodiment. The thermometer 30 shown by the imaginary line will be described in the second variation below. The flushing valve 32 shown by the imaginary line will be described in the third variation below. The oil pressure system 1 shown in FIG. 1 is installed in a machine vehicle such as a hydraulic excavator (not shown). The machine vehicle has, for example, left and right traveling crawlers provided on the undercarriage. The oil pressure system 1 drives one of the left and right traveling crawlers.

As shown in FIG. 1, the oil pressure system 1 is what is called an HST (Hydro Static Transmission) circuit. The hydraulic system 1 includes an oil pressure pump 4 (an example of the hydraulic pump recited in the claims) driven by an engine 3 as a power source, a displacement control device 5 for controlling the flow rate of the oil pressure pump 4, a charging pump 6 for replenishing the hydraulic oil leaking in the hydraulic system 1, and a traveling unit 10 for driving the traveling crawler for traveling of the machine vehicle. The flow rate of the oil pressure pump 4 refers to the discharge flow rate of the oil pressure pump 4 or the displacement of the oil pressure pump 4.

<Engine>

The drive shaft of the engine 3 is connected to the rotating shaft of the oil pressure pump 4. The output (rotation speed) of the engine 3 is adjusted, for example, by operating an operating unit (not shown). The operating unit may be an operating pedal that is operated by a foot of the operator or a joystick lever that is operated by a hand of the operator. The engine 3 is equipped with an engine tachometer 7 for measuring the rotation speed of the drive shaft (hereinafter also referred to as the rotation speed of the engine). The engine tachometer 7 is electrically connected to a controller 24 described later. The engine tachometer 7 measures the rotation speed of the engine and inputs the measured information as an engine rotation speed signal to the controller 24.

<Oil Pressure Pump>

The rotating shaft of the oil pressure pump 4 rotates together with the drive shaft of the engine 3. As the rotating shaft rotates, the oil pressure pump 4 discharges the hydraulic oil into the oil passage (channel) connected to the oil pressure motor 17 (an example of the hydraulic motor recited in the claims) described later, thereby pressurizing the hydraulic oil. The oil pressure pump 4 is, for example, what is called a variable displacement oil pressure pump having a swash plate (not shown) for adjusting the discharge rate of the hydraulic oil steplessly. The oil pressure pump 4 is, for example, a pump for an HST circuit. The discharge rate of the hydraulic oil from the oil pressure pump 4 can be adjusted steplessly by changing the tilt angle (inclination angle) of the swash plate.

<Displacement Control Device>

The oil pressure pump 4 is equipped with a displacement control device 5 for controlling the flow rate of the oil pressure pump 4. The displacement control device 5 controls the tilt angle of the swash plate in the oil pressure pump 4. Specifically, the displacement control device 5 controls the tilt angle of the swash plate according to the increase or decrease of the hydraulic oil pressure in the charge oil passage 8 of the oil pressure system 1. Thus, the displacement control device 5 controls the flow rate of the oil pressure pump 4 proportionally.

<Charging Pump>

A charging pump 6 is connected to the charge oil passage 8. The charging pump 6 has, for example, a rotating shaft connected to the drive shaft of the engine 3, thereby using the engine 3 as a power source to discharge (pressurize) the hydraulic oil in the charge oil passage 8. In other words, the charging pump 6 replenishes the hydraulic oil leaking in the oil pressure system 1. The flow rate of the hydraulic oil obtained by the charging pump 6 is hereinafter also referred to as the charging pump flow rate. A charge relief valve 9 is connected to the charge oil passage 8. The charge relief valve 9 returns (drains) excess hydraulic oil to a tank 12 such that the pressure of the hydraulic oil in the charge oil passage 8 does not exceed a set pressure.

<Traveling Unit>

The traveling unit 10 is connected to the oil pressure pump 4. The traveling unit 10 includes: an oil pressure motor 17 connected to the oil pressure pump 4 through the first main oil passage 15 and the second main oil passage 16; a motor tachometer 18 for measuring the output rotation speed of the oil pressure motor 17; a low-pressure selector valve 19 connected to the first main oil passage 15 and the second main oil passage 16; a solenoid proportional valve 20 (an example of the control valve recited in the claims) connected downstream of the low-pressure selector valve 19; a first pressure sensor 21 for measuring the pressure in the first main oil passage 15; a second pressure sensor 22 for measuring the pressure in the second main oil passage 16; and a controller 24 electrically connected to the engine tachometer 7, the first pressure sensor 21, the second pressure sensor 22, the motor tachometer 18, and the solenoid proportional valve 20.

In the traveling unit 10, for example, the oil pressure motor 17, the motor tachometer 18, the low-pressure selector valve 19, the solenoid proportional valve 20, the first pressure sensor 21, the second pressure sensor 22, and controller 24 are integrated together into a unit. The traveling unit 10 is hereinafter also referred to as the oil pressure motor unit 10.

<Oil Pressure Motor>

The oil pressure motor 17 is a motor for an HST circuit that is connected to the first main oil passage 15 and the second main oil passage 16 and constitutes a closed circuit together with the oil pressure pump 4. The oil pressure motor 17 is a motor for traveling, for example, with a speed reducer 25 and a brake (not shown) integrated together. The output shaft of the oil pressure motor 17 is connected to the traveling crawler via the speed reducer 25 and other components.

The output shaft of the oil pressure motor 17 is rotated by the hydraulic oil discharged from the oil pressure pump 4. In the embodiment, a constant-displacement motor is taken as an example of the oil pressure motor 17. However, this example is not limitative. The oil pressure motor 17 may be other motors such as a variable displacement motor. In the embodiment, an axial piston motor is taken as an example of the oil pressure motor 17. However, this example is not limitative. The oil pressure motor 17 may be other motors such as a radial piston motor. The oil pressure motor 17 is driven by the oil pressure pump 4 to drive the traveling crawler for traveling of the machine vehicle.

<Motor Tachometer>

The motor tachometer 18 is provided at a position where, for example, the rotation speed of the output shaft of the oil pressure motor 17 (hereinafter also referred to as the rotation speed of the motor) can be measured. The motor tachometer 18 is electrically connected to the controller 24 described later. The motor tachometer 18 measures the rotation speed of the motor and inputs the measured information as a motor rotation speed signal to the controller 24.

<Low-Pressure Selector Valve>

The low-pressure selector valve 19 is connected to the first main oil passage 15 and the second main oil passage 16 downstream of the oil pressure motor 17. The low-pressure selector valve 19 selects the hydraulic oil under a lower pressure from the hydraulic oils in the first main oil passage 15 and the second main oil passage 16 and directs the selected hydraulic oil to the downstream side. Specifically, when, for example, the hydraulic pressure of the first main oil passage 15 is higher than that of the second main oil passage 16 and exceeds a setting value, the low-pressure selector valve 19 returns the hydraulic oil of the second main oil passage 16 to the tank 12 through the solenoid proportional valve 20 and the tank oil passage 26. This reduces the pressure of the hydraulic oil in the charge oil passage 8, and the displacement control device 5 controls the swash plate of the oil pressure pump 4 in response to the reduction in hydraulic oil pressure.

When, for example, the hydraulic pressure of the second main oil passage 16 is higher than that of the first main oil passage 15 and exceeds a setting value, the low-pressure selector valve 19 returns the hydraulic oil of the first main oil passage 15 to the tank 12 through the solenoid proportional valve 20 and the tank oil passage 26. This reduces the pressure of the hydraulic oil in the charge oil passage 8, and the displacement control device 5 controls the swash plate of the oil pressure pump 4 in response to the reduction in hydraulic oil pressure.

<Solenoid Proportional Valve>

The solenoid proportional valve 20 is connected downstream of the low-pressure selector valve 19 and is electrically connected to the controller 24 described later. The solenoid proportional valve 20 returns the hydraulic oil directed through the low-pressure selector valve 19, to the tank 12 through the tank oil passage 26 based on the output signal sent from the controller 24.

<First Pressure Sensor, Second Pressure Sensor>

The first pressure sensor 21 is provided on the first main oil passage 15 upstream of the low-pressure selector valve 19 and is electrically connected to the controller 24 described later. The first pressure sensor 21 measures the pressure of the hydraulic oil in the first main oil passage 15 (hereinafter also referred to as the first hydraulic pressure). The first pressure sensor 21 outputs the measured information as a first pressure signal to the controller 24. The second pressure sensor 22 is provided on the second main oil passage 16 upstream of the low-pressure selector valve 19 and is electrically connected to the controller 24 described later. The second pressure sensor 22 measures the pressure of the hydraulic oil in the second main oil passage 16

(hereinafter also referred to as the second hydraulic pressure). The second pressure sensor 22 outputs the measured information as a second pressure signal to the controller 24.

<Controller>

The controller 24 receives a signal indicating the information on the rotation speed of the motor measured by the motor tachometer 18. The controller 24 calculates the flow rate of the hydraulic oil in the oil pressure motor 17 (hereinafter also referred to as the flow rate of the oil pressure motor 17) based on the received information. In the embodiment, the flow rate of the oil pressure motor 17 is calculated based on the rotation speed of the motor measured by the motor tachometer 18. However, this example is not limitative. It is also possible to substitute a motor flowmeter for the motor tachometer 18 to directly measure the flow rate of the oil pressure motor 17.

The controller 24 receives a signal indicating the information on the first hydraulic pressure measured by the first pressure sensor 21 and the second hydraulic pressure measured by the second pressure sensor 22. The controller 24 receives a signal indicating the information on the rotation speed of the engine measured by the engine tachometer 7. In addition, the controller 24 outputs a control signal to the solenoid proportional valve 20 based on a value calculated from the flow rate of the oil pressure motor 17, the first hydraulic pressure, the second hydraulic pressure, and the rotation speed of the engine.

<Operation of Traveling Unit>

Figure 2:
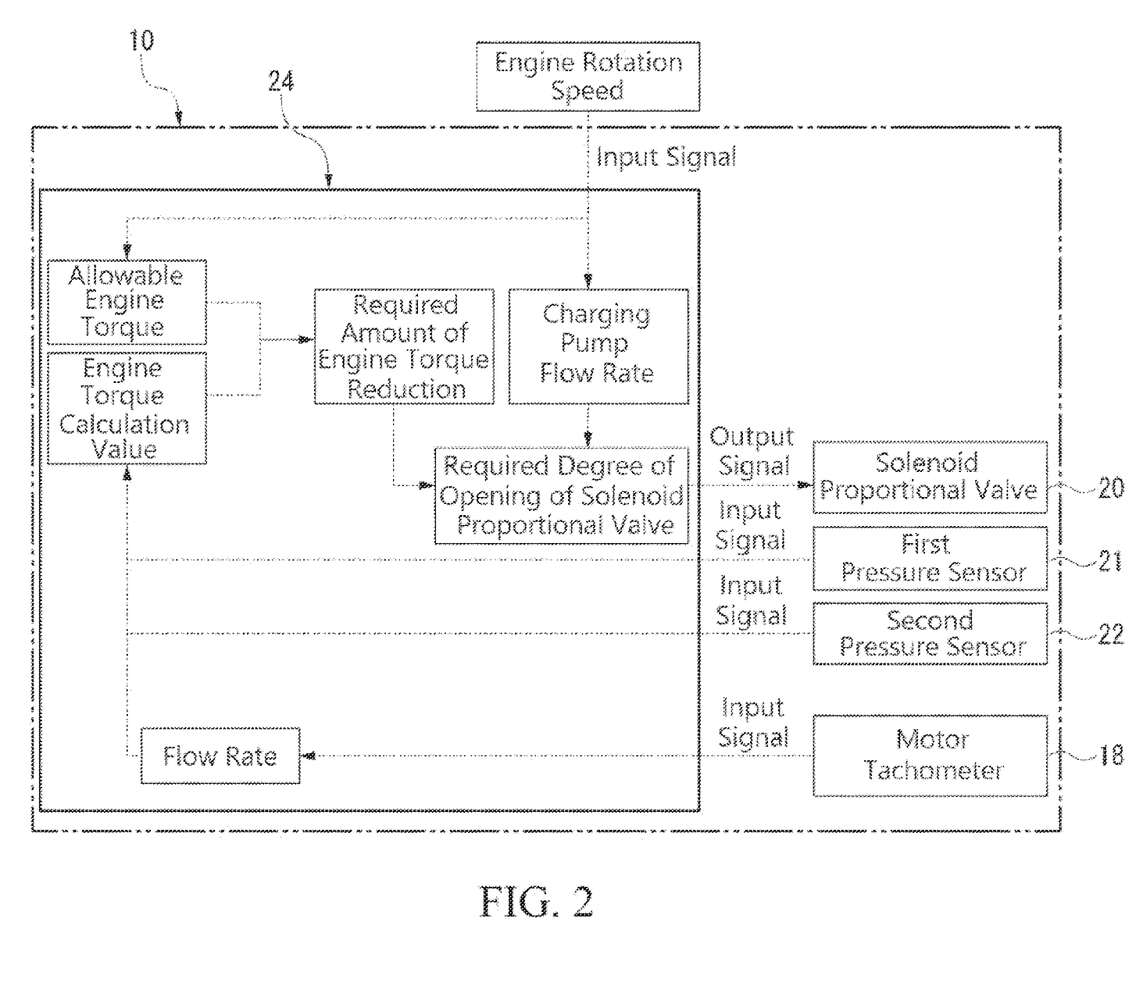
FIG. 2 is a block diagram illustrating an example in which a controller controls the engine torque consumed by the oil pressure system relating to the embodiment of the present disclosure.
Figure 3:
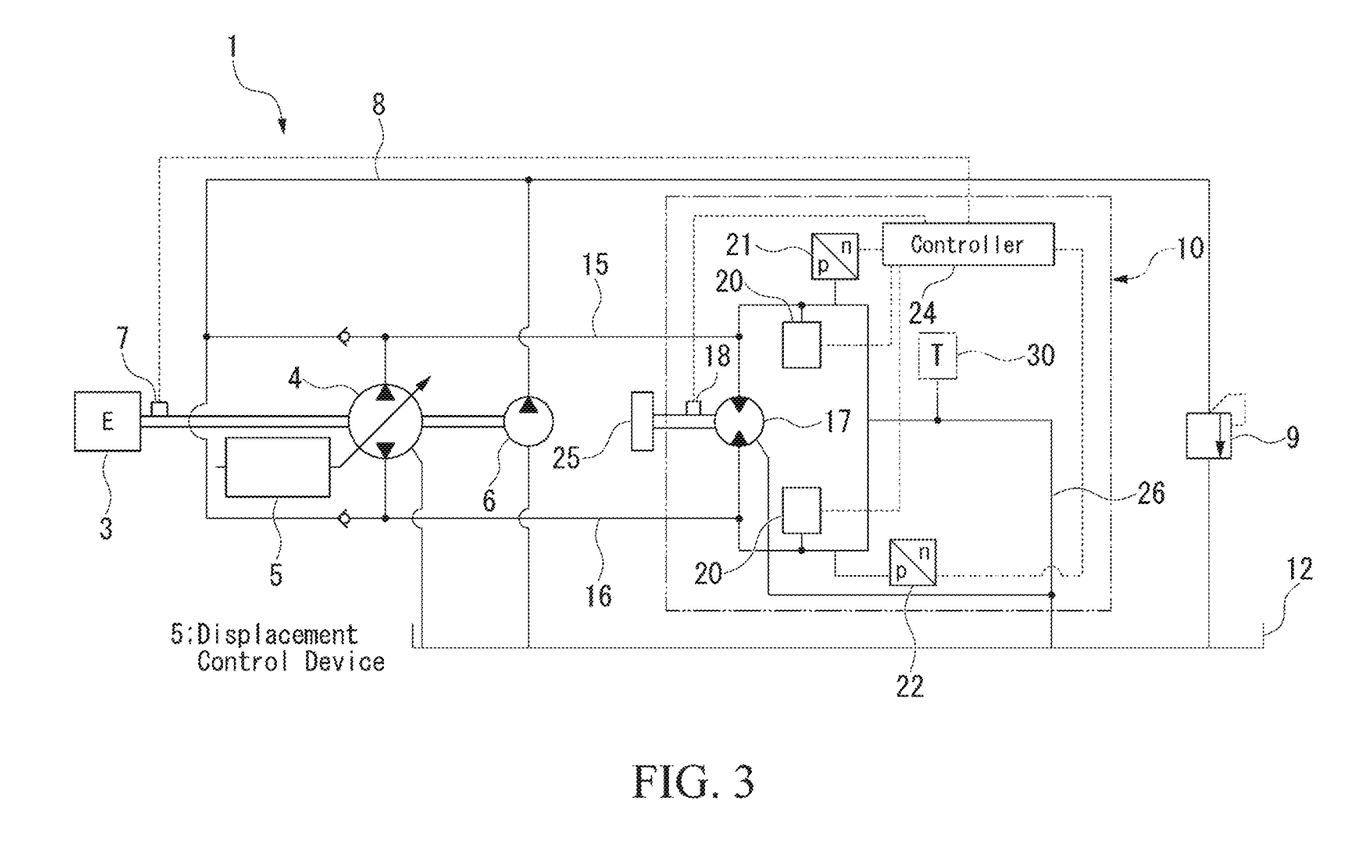
FIG. 3 schematically illustrates an oil pressure system relating to another embodiment of the present disclosure.

The following describes how the traveling unit 10 operates, with reference to FIGS. 1 and 2. As shown in FIG. 1, the engine 3 drives the oil pressure pump 4 and the charging pump 6. The oil pressure pump 4 is driven, for example, to discharge the hydraulic oil into the first main oil passage 15 and to suck in the hydraulic oil from the second main oil passage 16. This causes the pressure of the hydraulic oil in the first main oil passage 15 to be higher than the pressure of the hydraulic oil in the second main oil passage 16. As a result, the oil pressure motor 17 of the traveling unit 10 is rotated.

The oil pressure motor 17 is rotated to drive the traveling crawler for traveling of the machine vehicle or earth removal operation with a blade. During traveling or earth removal operation of the machine vehicle, for example, the engine 3 is held at full throttle.

FIG. 2 is a block diagram illustrating an example in which the controller 24 controls the torque of the engine 3 consumed by the oil pressure system 1. As shown in FIGS. 1 and 2, the rotation speed of the engine is measured by the engine tachometer 7. This rotation speed is input as an engine rotation speed signal to the controller 24. The controller 24 sets the allowable engine torque value (an example of the allowable load of the hydraulic device and the allowable engine torque value recited in the claims) based on the engine rotation speed signal input to the controller 24.

The allowable engine torque value is preset and stored in the controller 24. The allowable engine torque value is, for example, the maximum torque of the engine 3 set in association with the rotation speed of the engine 3. The controller 24 calculates the flow rate of the hydraulic oil obtained by the charging pump 6 (i.e., the charging pump flow rate) based on the engine rotation speed signal input to the controller 24.

The first pressure sensor 21 measures the first pressure of the hydraulic oil in the first main oil passage 15 (an example of the discharge pressure of the hydraulic pump recited in the claims). The first pressure is input to the controller 24 as the first pressure signal. The second pressure sensor 22 measures the second pressure of the hydraulic oil in the second main oil passage 16 (an example of the suction pressure of the hydraulic pump recited in the claims). The second pressure is input to the controller 24 as the second pressure signal. The motor tachometer 18 measures the rotation speed of the oil pressure motor 17. This rotation speed is input as a motor rotation speed signal to the controller 24.

The controller 24 calculates the flow rate of the hydraulic oil in the oil pressure motor 17 (i.e., the flow rate of the oil pressure motor 17) based on the motor rotation speed signal input to the controller 24. In this state, the controller 24 calculates the load of the oil pressure system 1 based on the first pressure, the second pressure, and the flow rate of the oil pressure motor 17. The torque of the engine 3 is consumed by the calculated load of the oil pressure system 1. The engine torque consumed by the calculated load of the oil pressure system 1 is described below as the engine torque calculation value (an example of the measured load of the hydraulic device and the engine torque calculation value recited in the claims).

The controller 24 compares the set allowable engine torque value with the calculated engine torque calculation value (comparison step). The engine torque calculation value is expected to exceed or surpass the allowable engine torque value when the engine 3 is overloaded during traveling, earth removal operation or the like of the machine vehicle. The expression "exceed or surpass the allowable engine torque value" may be hereinafter abbreviated as "exceed the allowable engine torque value." The controller 24 compares the allowable engine torque value with the engine torque calculation value, and if the engine torque calculation value is expected to exceed the allowable engine torque value, the controller 24 calculates the required amount of engine torque reduction as the amount of torque needing to be attenuated.

Based on the required amount of engine torque reduction and the charging pump flow rate, the controller 24 calculates the degree of opening of the solenoid proportional valve required to inhibit the engine torque calculation value from exceeding the allowable engine torque value (i.e., the required degree of opening of the solenoid proportional valve). The controller 24 sends an output signal of the required degree of opening of the solenoid proportional valve to the solenoid proportional valve 20. The solenoid proportional valve 20 is controlled to adjust the flow rate of the hydraulic oil based on the output signal from the controller 24.

The hydraulic pressure of the first main oil passage 15 is set to be higher than the hydraulic pressure of the second main oil passage 16. Therefore, the spool of the low-pressure selector valve 19 moves in the direction of the arrow A (see FIG. 1) by the hydraulic pressure of the first main oil passage 15. As the spool of the low-pressure selector valve 19 moves in the direction of the arrow A, the hydraulic oil of the second main oil passage 16 is directed through the low-pressure selector valve 19 to the solenoid proportional valve 20.

The solenoid proportional valve 20 is controlled to adjust the flow rate of the hydraulic oil based on the output signal from the controller 24. Therefore, the hydraulic oil of the second main oil passage 16 directed to the solenoid proportional valve 20 is returned from the solenoid proportional valve 20 through the tank oil passage 26 to the tank 12. This reduces the pressure of the hydraulic oil in the charge oil passage 8 of the oil pressure system 1 on the second main oil passage 16 side.

The reduced pressure of the hydraulic oil in the charge oil passage 8 controls the tilt angle of the swash plate of the oil pressure pump 4 because of the characteristics of the displacement control device 5. This reduces the flow rate at which the hydraulic oil is discharged from the oil pressure pump 4. In other words, the flow rate of the oil pressure pump 4 can be reduced by adjusting the solenoid proportional valve 20.

As a result, the engine torque calculation value can be reduced. Therefore, the engine torque calculation value can be suitably inhibited from exceeding the allowable engine torque value. This inhibits the engine from stalling or the rotation speed of the engine from dropping when the engine 3 is overloaded during, for example, traveling or earth removal operation of the machine vehicle. Hereinafter, the stall of the engine is also referred to as "engine stall," and the rotation speed of the engine is also referred to as "engine rotation speed."

As described above, in the method of controlling the oil pressure system 1 (hydraulic device) of the embodiment, the controller 24 compares the engine torque calculation value (measured load of the oil pressure system 1) with the allowable engine torque value (allowable load of the oil pressure system 1) (comparison step) to control the flow rate (discharge flow rate, displacement) of the oil pressure pump 4 (control step). Therefore, when the engine torque calculation value is expected to exceed the allowable engine torque value, the engine torque calculation value can be responsively inhibited from exceeding the allowable engine torque value.

More specifically, the controller 24 compares the engine torque calculation value with the allowable engine torque value in the comparison step and adjusts the solenoid proportional valve 20, so as to perform control to reduce the flow rate (discharge flow rate, displacement) of the oil pressure pump 4 in the control step. This suitably inhibits the engine stall or dropping of the engine rotation speed when the engine 3 is overloaded during, for example, traveling or earth removal operation of the machine vehicle.

The engine torque calculation value is calculated based on the first pressure, the second pressure, and the flow rate of the oil pressure motor 17. The flow rate of the oil pressure motor 17 is calculated based on the motor rotation speed measured by the motor tachometer 18. The first pressure sensor 21, which measures the first pressure, the second pressure sensor 22, which measures the second pressure, and the motor tachometer 18, which measures the motor rotation speed, are installed together in the traveling unit 10. Therefore, the first pressure sensor 21, the second pressure sensor 22, and the motor tachometer 18 can be integrated together with the oil pressure motor 17 as the oil pressure motor unit 10. Therefore, the traveling unit (i.e., the oil pressure motor unit) 10 can be applied not only to the oil pressure pump 4 of the embodiment, but also to other oil pressure pumps. The applications of the traveling unit 10 can be expanded.

The allowable engine torque value is set in accordance with the engine rotation speed. Therefore, the accuracy of the allowable engine torque value can be increased compared to, for example, the case where the allowable engine torque value is set to a constant value based on the specifications of the engine 3. This suitably inhibits the engine stall or dropping of the engine rotation speed when the engine 3 is overloaded during, for example, traveling or earth removal operation of the machine vehicle.

When the engine torque calculation value is compared with the allowable engine torque value to find that the engine torque calculation value is expected to exceed the allowable engine torque value, the flow rate of the oil pressure pump 4 is reduced by adjusting the solenoid proportional valve 20. The solenoid proportional valve 20 is installed together with other components in the traveling unit 10. Therefore, the solenoid proportional valve 20 can be integrated together with the oil pressure motor 17 as the oil pressure motor unit 10. In other words, it can be ensured that the traveling unit (i.e., the oil pressure motor unit) 10 reduces the flow rate of the oil pressure pump 4. Therefore, the traveling unit 10 can be applied not only to the oil pressure pump 4 of the embodiment, but also to other oil pressure pumps. The applications of the traveling unit 10 can be expanded.

The flow rate of the oil pressure pump 4 is controlled by the solenoid proportional valve 20. Therefore, there is no need to provide an external component for controlling the flow rate of the oil pressure pump 4 used in the HST oil pressure system 1 (used for an HST circuit) including the oil pressure motor 17, the solenoid proportional valve 20, the low-pressure selector valve 19 and so on integrated together, as in this embodiment. It is possible to control the flow rate of the oil pressure pump 4 with the traveling unit 10 alone. More specifically, the flow rate of the oil pressure pump 4 is reduced by adjusting the solenoid proportional valve 20. Therefore, the flow rate of the oil pressure pump 4 can be reduced by adjusting the flow rate of the hydraulic oil with the solenoid proportional valve 20. Thus, the flow rate of the oil pressure pump 4 can be reduced responsively.

The oil pressure pump 4 is controlled by the displacement control device 5 during, for example, normal traveling of the machine vehicle. This simplifies the control by avoiding overlap and interference between the control by the displacement control device 5 during normal traveling and the control to reduce the flow rate of the oil pressure pump 4 by adjusting the flow rate of the hydraulic oil with the solenoid proportional valve 20.

The following describes the first to third variations of the oil pressure system 1 of the embodiment.

[First Variation]

In the embodiment, when the engine torque calculation value is expected to exceed the allowable engine torque value, the pressure of the hydraulic oil in the charge oil passage 8 is reduced by the solenoid proportional valve 20, thereby reducing the flow rate of the oil pressure pump 4 by the displacement control device 5. However, this method is not limitative. For example, when the engine torque calculation value is expected to exceed the allowable engine torque value, a signal output from the controller 24 may directly control the displacement control device 5.

With the controller directly controlling the displacement control device 5, the swash plate of the oil pressure pump 4 can be adjusted directly. This allows for better response in adjusting the swash plate of the oil pressure pump 4. Thus, the flow rate of the oil pressure pump 4 can be reduced more responsively. This inhibits more suitably the engine stall or dropping of the engine rotation speed when the engine 3 is overloaded during, for example, traveling or earth removal operation of the machine vehicle.

[Second Variation]

In the embodiment, the engine torque calculation value is calculated based on the first pressure, the second pressure, and the motor rotation speed. However, this method is not limitative, and the temperature of the hydraulic oil (an example of the liquid temperature recited in the claims) may be taken into account in the calculation of the engine torque calculation value.

For example, the flow rate of the hydraulic oil returned to the tank 12 through the solenoid proportional valve 20 may vary in response to temperature changes. Therefore, as shown in FIG. 1, a thermometer 30 shown by the imaginary line is installed in the oil passage upstream of the solenoid proportional valve 20 in the charge oil passage 8. The thermometer 30 is connected to the controller 24. The thermometer 30 may be, for example, a thermocouple.

The thermometer 30 measures the temperature of the hydraulic oil in the oil passage upstream of the solenoid proportional valve 20. The thermometer 30 inputs the measured temperature of the hydraulic oil to the controller 24 as a temperature signal of the hydraulic oil. The controller 24 takes into account the temperature of the hydraulic oil along with the first pressure, the second pressure, and the motor rotation speed in calculating the engine torque calculation value. Therefore, the engine torque calculation value (i.e., the engine torque consumed by the load on the oil pressure system 1) can be calculated more accurately.

The engine torque calculation value is compared with the allowable engine torque value to calculate the required amount of engine torque reduction. Based on the required amount of engine torque reduction and the charging pump flow rate, the required degree of opening of the solenoid proportional valve is calculated. The flow rate of the hydraulic oil in the solenoid proportional valve 20 is adjusted based on the output signal of the calculated required degree of opening of the solenoid proportional valve. By adjusting the solenoid proportional valve 20, the flow rate of the oil pressure pump 4 is reduced. This inhibits more accurately the engine stall or dropping of the engine rotation speed when the engine 3 is overloaded during, for example, traveling or earth removal operation of the machine vehicle.

[Third Variation]

In the embodiment, the solenoid proportional valve 20 is connected downstream of the low-pressure selector valve 19. However, this configuration is not limitative. In addition to the solenoid proportional valve 20, a flushing valve 32 may be connected downstream of the low-pressure selector valve 19.

When higher one of the hydraulic pressures in the first main oil passage 15 and the second main oil passage 16 exceeds the setting value, the low-pressure selector valve 19 directs the hydraulic oil of the lower hydraulic pressure to the flushing valve 32. The flushing valve 32 returns the hydraulic oil of the lower hydraulic pressure (an example of the hydraulic fluid recited in the claims) directed from the low-pressure selector valve 19 to the tank 12 (drain step). By returning the hydraulic oil from the flushing valve 32 to the tank 12, the heat of the hydraulic oil in the first and second main oil passages 15 and 16 can be released to the outside to maintain the temperature of the hydraulic oil suitably, thus increasing the cooling effect of the hydraulic oil.

The technical scope of the present disclosure is not limited to the embodiment described above but is susceptible of various modification within the purport of the present disclosure. For example, in the embodiment described above, the oil pressure system 1 has only one set of traveling unit 10 and oil pressure pump 4. However, this example is not limitative. For example, the oil pressure system 1 may have two or more sets of traveling unit 10 and oil pressure pump 4. The oil pressure pump 4 may include multiple systems integrated together, such as in a tandem pump.

In the embodiments described above, the oil pressure pump 4 is a swash plate pump. However, this configuration is not limitative. For example, the oil pressure pump 4 may be a pump other than a swash plate pump.

In the embodiment described above, the oil pressure system 1 includes, for example, the traveling unit 10, the oil pressure pump 4, the displacement control device 5, and the charge relief valve 9 each configured separately. However, this configuration is not limitative. For example, some of the traveling unit 10, the oil pressure pump 4, the displacement control device 5, and the charge relief valve 9 may be integrated, or all of the traveling unit 10, the oil pressure pump 4, the displacement control device 5, and the charge relief valve 9 may be integrated.

In the embodiment described above, the unit including the oil pressure motor 17 is used as the traveling unit 10 for traveling of a machine vehicle. However, this configuration is not limitative. For example, the unit including the oil pressure motor 17 can be used as other drive units such as for slewing a slewable upper structure of a machine vehicle.

In the embodiment described above, the allowable engine torque value is set in accordance with the engine rotation speed measured by the engine tachometer 7. However, this method is not limitative. For example, the allowable engine torque value may be set in accordance with the amount of operation of the operation unit (i.e., an operation pedal, joystick lever, etc.) for operating the engine 3. In this case, the amount of operation of the operation unit is measured by an operation amount sensor, and the operation amount signal is input to the controller 24 instead of the engine rotation speed signal. This increases the accuracy of the allowable engine torque value as in the case where the allowable engine torque value is set in accordance with the engine rotation speed.

In the embodiment described above, for example, the controller 24, the motor tachometer 18, the solenoid proportional valve 20, the first pressure sensor 21, and the second pressure sensor 22 that operate individually are disposed together in the traveling unit 10. However, this configuration is not limitative. For example, the controller 24 can be integrated with any of the solenoid proportional valve 20, the first pressure sensor 21, the second pressure sensor 22, and the motor tachometer. Alternatively, the controller 24 can be integrated with another controller.

In the embodiment described above, the controller 24, the solenoid proportional valve 20, the first pressure sensor 21, the second pressure sensor 22, and the motor tachometer 18 are installed in the traveling unit 10. However, this configuration is not limitative. For example, the controller 24, the solenoid proportional valve 20, the first pressure sensor 21, the second pressure sensor 22, and the motor tachometer 18 can be installed outside the traveling unit 10. In this case, the controller 24, the solenoid proportional valve 20, the first pressure sensor 21, the second pressure sensor 22, and the motor tachometer 18 can be installed by retrofitting.

In the embodiment described above, a single traveling unit 10 includes a single controller 24 for controlling the solenoid proportional valve 20, the first pressure sensor 21, the second pressure sensor 22, and the motor tachometer 18. However, this method is not limitative. For example, it is also possible that a single controller 24 centrally controls the solenoid proportional valves 20, the first pressure sensors 21, the second pressure sensors 22, and the motor tachometers 18 installed in two or more traveling units.

In the embodiment described above, a single solenoid proportional valve 20 is installed downstream of the low-pressure selector valve 19 in the traveling unit 10. However, this configuration is not limitative. For example, it is also possible that the solenoid proportional valve 20 is connected to the first main oil passage 15 and the second main oil passage 16, as shown by the imaginary lines. In this case, the low-pressure selector valve 19 can be eliminated.

In the embodiment, the motor rotation speed is measured by the motor tachometer 18. However, this method is not limitative. For example, it is also possible that the output rotation speed of the speed reducer 25 provided for the oil pressure motor 17 is measured by an output tachometer, and the measured output rotation speed is substituted for the motor rotation speed.

In the embodiment described above, the oil pressure motor 17 in the traveling unit 10 has the speed reducer 25 and a brake integrated thereto. However, this configuration is not limitative. For example, the oil pressure motor 17, the speed reducer 25, and the brake may be separate from each other.

In the embodiment described above, a digital filter is not applied to various signals and calculations in the controller 24. However, this configuration is not limitative. For example, a digital filter may be applied to various signals and calculations in the controller 24.

In the embodiment described above, the oil pressure system 1 is installed in a machine vehicle such as for example a hydraulic excavator (not shown). However, this configuration is not limitative. The oil pressure system 1 can be employed in various machine vehicles and in various oil pressure devices other than mechanical vehicles.

In the embodiment described above, the hydraulic device is the oil pressure system 1 using the hydraulic oil. The liquid for the hydraulic device is the hydraulic oil. However, these examples are not limitative. The configuration of the oil pressure system 1 may be applied to hydraulic devices using various liquids other than the hydraulic oil.

The elements of the embodiments described above may be replaced with known elements within the purport of the present disclosure. The variations described above may be combined.

In the embodiments disclosed herein, a member formed of multiple components may be integrated into a single component, or conversely, a member formed of a single component may be divided into multiple components. Irrespective of whether or not the constituent parts are integrated, they are acceptable as long as they are configured to solve the problems.

What is claimed is:

1. A method of controlling a hydraulic device, comprising:
    a comparison step of comparing a measured load of the hydraulic device driven by a hydraulic pump with an allowable load of the hydraulic device; and
    a control step of controlling a flow rate of the hydraulic pump based on a result of comparison between the measured load and the allowable load,
    wherein an engine drives the hydraulic pump, and the hydraulic pump drives a hydraulic motor, and
    wherein the measured load of the hydraulic device includes an engine torque calculation value calculated based on a discharge pressure of the hydraulic pump, a suction pressure of the hydraulic pump, and a rotation speed of the hydraulic motor or a flow rate of the hydraulic motor.

2. The method of controlling a hydraulic device according to claim 1, wherein the allowable load of the hydraulic device includes an allowable engine torque value predetermined based on a rotation speed of the engine or an amount of operation of an operation unit for operating the engine.

3. The method of controlling a hydraulic device according to claim 2, wherein in the control step, the flow rate of the hydraulic pump is controlled by a control valve.

4. The method of controlling a hydraulic device according to claim 3, wherein in the comparison step, comparison is performed between the engine torque calculation value as the measured load and the allowable engine torque value as the allowable load, and
    wherein in the control step, when the engine torque calculation value exceeds the allowable engine torque value, the flow rate of the hydraulic pump is reduced by adjusting the control valve.

5. The method of controlling a hydraulic device according to claim 2, wherein the hydraulic pump includes a variable displacement hydraulic pump of which a flow rate is varied by adjusting a tilt angle of a swash plate, and
    wherein in the control step, the flow rate of the hydraulic pump is controlled by adjusting the tilt angle of the swash plate.

6. The method of controlling a hydraulic device according to claim 5, wherein in the comparison step, comparison is performed between the engine torque calculation value as the measured load and the allowable engine torque value as the allowable load, and
    wherein in the control step, when the engine torque calculation value exceeds the allowable engine torque value, the flow rate of the hydraulic pump is reduced by adjusting the tilt angle of the swash plate.

7. The method of controlling a hydraulic device according to claim 3, wherein the engine torque calculation value is calculated further taking into account a liquid temperature measured upstream of the control valve.

8. The method of controlling a hydraulic device according to claim 1, further comprising: a drain step of draining a hydraulic fluid by a flushing valve from a channel connected to the hydraulic motor.

9. A method of controlling a hydraulic device, comprising:
    a comparison step of comparing a measured load of the hydraulic device driven by a hydraulic pump with an allowable load of the hydraulic device; and
    a control step of controlling a flow rate of the hydraulic pump based on a result of comparison between the measured load and the allowable load,
    wherein an engine drives the hydraulic pump, and the hydraulic pump drives a hydraulic motor,
    wherein an engine torque calculation value is calculated based on a discharge pressure of the hydraulic pump, a suction pressure of the hydraulic pump, and a rotation speed of the hydraulic motor or a flow rate of the hydraulic motor,
    wherein an allowable engine torque value is predetermined based on a rotation speed of the engine or an amount of operation of an operation unit for operating the engine,
    wherein in the comparison step, comparison is performed between the engine torque calculation value as the measured load and the allowable engine torque value as the allowable load, and
    wherein in the control step, when the engine torque calculation value exceeds the allowable engine torque value, the flow rate of the hydraulic pump is reduced by adjusting a control valve.

* * * * *